United States Patent [19]

Hentschel et al.

[11] Patent Number: 4,481,123

[45] Date of Patent: Nov. 6, 1984

[54] POLYETHERS, THEIR PREPARATION AND THEIR USE AS LUBRICANTS

[75] Inventors: Karl-Heinz Hentschel; Rolf Dhein, both of Krefeld; Siegfried Kussi, Leverkusen; Hans Winter; Herbert Vojacek, both of Munich, all of Fed. Rep. of Germany

[73] Assignee: Bayer Aktiengesellschaft, Leverkusen, Fed. Rep. of Germany

[21] Appl. No.: 371,031

[22] Filed: Apr. 22, 1982

[30] Foreign Application Priority Data

| May 6, 1981 | [DE] | Fed. Rep. of Germany | 3117841 |
| May 6, 1981 | [DE] | Fed. Rep. of Germany | 3117839 |
| May 6, 1981 | [DE] | Fed. Rep. of Germany | 3117840 |
| Mar. 20, 1982 | [DE] | Fed. Rep. of Germany | 3210283 |

[51] Int. Cl.$^3$ .................................. C10M 1/28
[52] U.S. Cl. ............................. 252/52 R; 252/52 A; 568/617; 568/625
[58] Field of Search ......................... 252/52 R, 52 A; 568/617, 625

[56] References Cited

U.S. PATENT DOCUMENTS

| 3,356,619 | 12/1967 | Kuntz . | |
| 3,359,332 | 12/1967 | Johnston | 568/617 |
| 3,451,930 | 6/1969 | Mead | 252/32.7 E |
| 4,139,567 | 2/1979 | Pruckmayr | 568/617 X |
| 4,228,272 | 10/1980 | Del Pesco | 568/617 X |

FOREIGN PATENT DOCUMENTS

| 0004536 | 11/1979 | European Pat. Off. . | |
| 1045662 | 12/1958 | Fed. Rep. of Germany | 568/617 |
| 941496 | 11/1963 | United Kingdom | 568/617 |

OTHER PUBLICATIONS

"The Condensed Chemical Dictionary", 9th Edition, p. 511, Lewis Acid, 1977.
Henko, L. O., "Roller Traction Drive Unit for Extremely Quiet Power Transmission", J. of Hydronautics, vol. 2, No. 3, Jul. 1968.

*Primary Examiner*—Andrew Metz
*Attorney, Agent, or Firm*—Sprung, Horn, Kramer & Woods

[57] ABSTRACT

The new polyethers obtainable by polymerization of an 1,2-epoxyalkane with 8 to 26 carbon atoms, and a tetrahydrofuran in the presence of a hydroxyl compound of the formula $$H\text{-}OR^1$$

in which $R^1$ denotes hydrogen, an alkyl radical having 1 to 24 carbon atoms or a hydroxyalkyl radical having 2 to 40 carbon atoms are disclosed together with their use as lubricants.

24 Claims, 5 Drawing Figures

POLYETHERS, THEIR PREPARATION AND THEIR USE AS LUBRICANTS

BACKGROUND OF THE INVENTION

The invention relates to new polyethers, their preparation and their use as lubricants, in particular as lubricants for power-transmission gears.

Power-transmission gears should operate with as little loss as possible in order to achieve a good transmission efficiency and to maintain a low level of heating of the gear units.

The total losses occurring in a gear unit comprise the frictional losses, which arise from the transmission of motion, under high contact force, by the surfaces which are rolling and simultaneously sliding on one another, and the churning losses and compression losses which are caused by the immersion of moving machine parts into the oil charge [Eiselt, H.: Beitrag zur experimentellen und rechnerischen Bestimmung der Fresstragfähigkeit von Zahnradgetriben unter Berücksichtigung der Zahnflankenreibung (Contribution on the experimental and theoretical determination of the load-carrying capacity, without seizing, of toothed gears, taking into account toothflank friction), Thesis, TU Dresden 1966; Ohlendorf, H.: Verlustleistung und Erwärmung von Stirnrädern (Power losses and heating of spur wheels), VDI-Z. 102 (1960) 216 bis 224; Huber G.: Untersuchungen über Flankentragfähigkeit und Wirkungsgrad von Zylinderschneckengetrieben (Evolventenschnecken) (Investigations on flank load-carrying capacity and efficiency of cylindrical worm-gears (involute worm-gears)), Thesis, TU Munich1978]. The compression losses are substantial, particularly in the case of high speed gears.

The lubricants employed in power-transmission gears which have a positive transmission of motion serve to minimize the frictional losses between the surfaces. At the same time, a stable lubricating film, which builds up owing to the rolling motion of the surfaces, should separate these surfaces from one another in order to keep wear of all types (seizing wear, pitting wear, low-speed wear and grey-spot wear) as low as possible.

The lubricant should have a minimum viscosity in order to be able to build up a sufficiently stable lubricating film. The more unfavourable the operating conditions, the greater must the chosen viscosity be in order to avoid unreliable wear. On the other hand, however, the churning losses increase sharply with increasing viscosity, resulting in an increase in the temperature of the gear unit.

Depending on the function of the lubricant in a power-transmisson gear, the lubricating qualities of liquid lubricants are determined by the frictional behavior under the operating conditions (Winter, H. and Vojacek, Influence of the Molecular Structure on the Traction Characteristics of Lubrication Fluids. Int. Symp. on Gearing Power Transm., Tokyo 1981), by the viscosity at the operating temperature, by the viscosity/-temperature characteristics and by the viscosity/pressure coefficient α which influences the thickness of the lubricating film (Schmiertechnik und Tribologie 27 (1980) 55 bis 57).

The frictional behavior is determined by the friction coefficient. It is defined as the quotient of the frictional force, due to the friction, and the contact force between the surfaces.

The friction coefficient essentially depends on the operation parameters, peripheral velocity of the surfaces which roll and slide on one another, slip and contact force between the two surfaces, the slip being defined as the absolute value of the quotient of the difference in the two peripheral velocities and the greater peripheral velocity.

The friction coefficient should be as low as possible in all operating areas in order to keep the frictional losses at a low level.

The viscosity of the lubricant should be as low as possible, the minimum viscosity at the operating temperature depending on the operating conditions.

The viscosity should depend as little as possible on the temperature. The viscosity index (generally abbreviated as VI) serves as a measure of the temperature dependence of the viscosity. The viscosity index should be as high as possible.

In addition, the lubricants should be compatible with the mineral oils customarily used in the systems to be lubricated (for example mechanical gears, roller bearings and plain bearings) so that complications do not arise with the residual amounts of mineral oils when a change is made from the mineral oils to the new lubricants. They should also be as hydrophobic as possible, since absorbed water promotes corrosion. In addition, a high thermal load capacity is desirable.

Japanese Preliminary Published Specification 50/13 3205 discloses polyalkylene glycol ethers which contain $C_8$-$C_{28}$ 1,2-epoxyalkane units and have a ratio of carbon to oxygen of from 3.5 to 9.5. Although these known polyalkylene glycol ethers can be used as lubricants in mixtures with mineral oils, their lubricating properties are not completely satisfactory in every respect. This becomes evident from the excessive coefficients of shearing friction.

The polyalkylene alkylene oxides disclosed in U.S. Pat. No. 3,382,055, which can be used as additives for relatively light lubricating oils, also have excessive friction coefficients.

SUMMARY OF THE INVENTION

New polyethers have been found, which are distinguished by a high compatibility and miscibility with mineral oil, a low absorption of water, a high heat load capacity and a high viscosity index, with simultaneously very low friction coefficients.

The new polyethers are obtainable by polymerization of an 1,2-epoxyalkane, comprising 8 to 26 carbon atoms, and a tetrahydrofuran in the presence of a hydroxyl compound of the formula (I)

$$H-OR^1 \qquad (I),$$

in which $R^1$ denotes hydrogen, an alkyl radical having 1 to 24 carbon atoms or a hydroxyalkyl radical having 2 to 40 carbon atoms.

The polyethers obtainable according to the invention comprise all polyethers having the same structure, regardless of the process by which they were prepared.

In general the polyethers according to the invention contain 10 to 98 parts by weight, preferably 20 to 95 parts by weight, particularly preferably 30 to 90 parts by weight, of 1,2-epoxyalkanes and 2 to 90 parts by weight, preferably 5 to 80 parts by weight, particularly preferably 10 to 70 parts by weight, of tetrahydrofuran, based in each case on the total amount of all oxacycloalkanes.

The hydroxy compound is in general used in an amount of 0.3 to 95 parts by weight, preferably 0.8 to 60 parts by weight, particularly preferably 1.6 to 50 parts by weight.

When water is used as the hydroxyl compound the amount of water added in the working-up at the end of the reaction is in general sufficient.

In a particular embodiment the polyethers according to the invention additionally contain a lower alkylene oxide component such as ethylene oxide and/or propylene or butylene oxide the hydroxy compound being either monofunctional or bifunctional.

Preferred polyethers with a lower alkylene oxide component and with a monofunctional hydroxy compound are obtainable by polymerization of 10 to 90 parts by weight of an 1,2-epoxyalkane, 5 to 55 parts by weight of a tetrahydrofuran and 0 to 40 parts by weight of ethylene oxide and/or 0 to 70 parts by weight of propylene or butylene oxide, at least ethylene oxide or propylene or butylene oxide being used, and in the presence of a monofunctional hydroxy compound of the formula (II)

H—OR²                                      (II)

in which $R^2$ denotes an alkyl radical with 1 to 24 carbon atoms, and the ratio of the number of carbon atoms to the number oxygen atoms in the polyether being 3.2 to 10:1.

Preferred polyethers with a lower alkylene oxide component and with a bifuncional hydroxyl compound are obtainable by polymerization of 10 to 90 parts by weight of an 1,2-epoxyalkane, 5 to 55 parts by weight of a tetrahydrofuran and 0 to 70 parts by weight of ethylene oxide and/or 0 to 70 parts by weight of propylene or butylene oxide, at least ethylene oxide or propylene or butylene oxide being used, and in the presence of a bifunctional hydroxy compound of the formula (III)

H—OR³                                      (III)

in which $R^3$ denotes hydrogen or a hydroxyalkyl radical with 2 to 40 carbon atoms, and the ratio of the number of carbon atoms to the number of oxygen atoms in the polyether being 3.6 to 10:1.

The lower alkylene oxide components ethylene oxide, propylene oxide and butylene oxide are used according to the invention in an amount of 0 to 70 parts by weight, preferably 5 to 65 parts by weight, particularly preferably 10 to 60 parts by weight, based on the total quantity of all oxacycloalkanes.

The amounts of the mono- and bi-functional hydroxy compounds correspond generally to the amounts of the hydroxy compounds in general.

In the new polyethers according to the invention, which are prepared in the presence of a lower alkylene oxide component and with monofunctional hydroxy compounds, the ratio of the number of carbon atoms to the number of oxygen atoms is 3.2 to 10:1, preferably 3.4 to 9.5:1, and particularly preferably 3.6 to 9.0:1.

In the new polyethers according to the invention, which are prepared in the presence of a lower alkylene oxide component and with bifunctional hydroxyl compounds, the ratio of the number of carbon atoms to the number of oxygen atoms is 3.6 to 10:1, preferably 3.8 to 9.5:1, and particularly preferably 4.0 to 9:1.

DETAILED DESCRIPTION OF THE INVENTION

Figure 1:
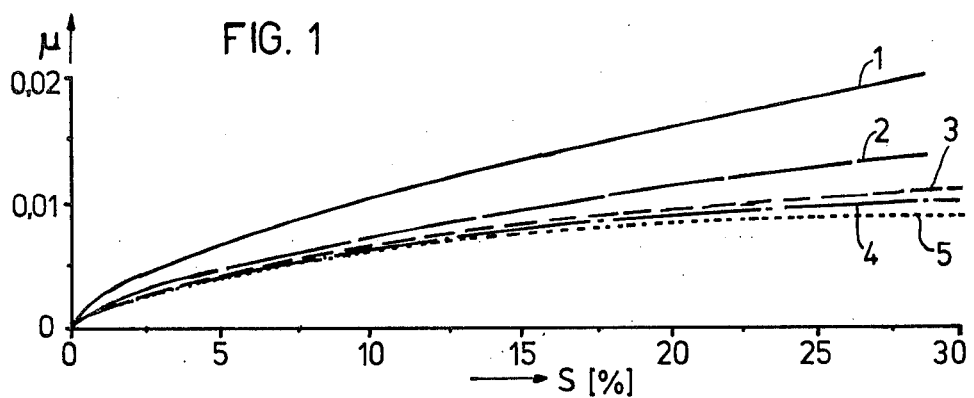

Preferred polyethers according to the invention, which are prepared in the presence of a lower alkylene oxide component and with monofunctional hydroxyl compounds, are obtainable by polymerization of 5 to 65 parts by weight of ethylene oxide and/or propylene oxide or butylene oxide 15 to 80 parts by weight of an 1,2-epoxyalkane comprising 8 to 16 carbon atoms, 10 to 50 parts by weight of a tetrahydrofuran and in the presence of a monofunctional compound of the formula (IV)

H—OR⁴                                      (IV),

in which $R^4$ denotes an alkyl radical having 1 to 18 carbon atoms, and the ratio of the number of carbon atoms to the number of oxygen atoms in the polyether being 3.4 to 9.5:1.

Preferred polyethers according to the invention, which are prepared in the presence of a lower alkylene oxide component and with bifunctional hydroxyl compounds, are obtainable by polymerization of 5 to 65 parts by weight of ethylene oxide and/or propylene or butylene oxide, 15 to 80 parts by weight of an 1,2-epoxyalkane, comprising 10 to 18 carbon atoms, 10 to 50 parts by weight of tetrahydrofuran and in the presence of a bifunctional hydroxy compound of the formula (V)

H—OR⁵                                      (V),

in which $R^5$ denotes hydrogen or a hydroxyalkyl radical with 2 to 18 carbon atoms, the ratio of the number of carbon atoms to the number of oxygen atoms in the polyether being 3.8 to 9.5:1.

The hydrocarbon radical of the 1,2-epoxyalkanes according to the invention can be straight-chain or branched and can contain 8 to 26, preferably 10 to 18, carbon atoms. The following 1,2-epoxy-alkanes may be mentioned as examples: 1,2-epoxy-octane 1,2-epoxy-nonane, 1,2-epoxy-decane, 1,2-epoxy-undecane, 1,2-epoxy-dodecane, 1,2-epoxy-tetradecane, 1,2-epoxy-hexadecane and 1,2-epoxy-octadecane.

In a particular embodiment of the present invention, it is possible to replace up to 70 mol % of the 1,2-epoxyalkane ($C_8$–$C_{26}$) employed by a glycidyl ester of a $C_5$–$C_{26}$-neoalkanoic acid. Neoalkanoic acids having 8 to 24 carbon atoms, in the form of their glycidyl esters, are preferably employed.

According to the invention, tetrahydrofuran also comprises tetrahydrofurans which are substituted by 1 to 4, preferably 1 or 2, lower alkyl radicals, in addition to the unsubstituted tetrahydrofuran. In this respect, lower alkyl radicals can be straight-chain or branched hydrocarbon radicals and can contain from 1 to about 6 carbon atoms. The following tetrahydrofurans may be mentioned as examples: 2-methyl-tetrahydrofuran, 3-methyl-tetrahydrofuran, 4-methyl-tetrahydrofuran, 5-methyl-tetrahydrofuran, 3- or 4-isopropyl-tetrahydrofuran, 3,4-diisopropyl-tetrahydrofuran, 2,3,4-tributyl-tetrahydrofuran and 2,3,4,5-tetramethyl-tetrahydrofuran. Unsubstituted tetrahydrofuran is preferred.

The hydroxy compounds according to the invention can be both monofunctional and bifunctional hydroxy compounds.

According to the invention, monofunctional hydroxy compounds can be alcohols, and the alkane radical of the alcohol can be straight-chain or branched and can contain 1 to 24, preferably 1 to 18, carbon atoms. The monofunctional hydroxy compounds may be mentioned as examples: methanol, ethanol, propanol, isopropanol, butanol, isobutanol, sec.-butanol, tert.-butanol, allyl alcohol, hexanol and 2-ethyl-hexanol.

According to the invention bifunctional hydroxy compounds can be water or dihydroxy alkanes, it being possible for the alkane radical to be straight-chain or branched and contain 2 to 40, preferably 2 to 18, carbon atoms. The hydroxy groups can be located at the ends as well as in the middle of the alkane.

Preferred bifunctional compounds are dihydroxyalkanes with terminal hydroxy groups. The following bifunctional compounds may be mentioned as examples: water, 1,2-ethanediol, 1,2-propanediol, 1,3-propanediol, 1,2-butanediol, 1,4-butanediol and 1,6-hexanediol. Preferred bifunctional hydroxy compounds are water, 1,2-ethanediol and 1,4-butanediol.

When water is used, the reaction mixture preferably comes into contact with the water only in the working-up phase and purification phase.

The new polyethers according to the invention have a molecular weight in the range from about 400 to about 10,000, preferably in the range from about 600 to about 4,000.

The new polyethers according to the invention have a kinematical viscosity at 40° C. of 5 to 3,000 mPa.s, preferably 20 to 500 mPa.s.

The viscosity index of the new polyethers according to the invention is in general in the range from 150 to 220.

The preparation of the new polyethers according to the invention can be effected according to polymerization processes which are in themselves known (Angew. Chem. 72, 927 to 934 (1960)), the disclosure of which is hereby incorporated herein by reference.

The process for the preparation of the new polyethers is characterized in that 10 to 98 parts by weight of an 1,2-epoxyalkane, comprising 8 to 26 carbon atoms, and 2 to 90 parts by weight of tetrahydrofuran are polymerized in the presence of a hydroxy compound of the formula (I)

$$H\text{—}OR^1 \qquad (I),$$

in which $R^1$ denotes hydrogen, an alkyl radical with 1 to 24 carbon atoms or a hydroxyalkyl radical with 2 to 40 carbon atoms.

The process according to the invention is in general carried out in the temperature range from −20° to 120° C., preferably from 0° to 80° C., particularly preferably from 20° to 60° C.

In general the process according to the invention is conducted at a pressure of 0.5 to 50 bar, preferably 1 to 10 bar, and particularly preferably 1.5 to 2 bar.

The process according to the invention is carried out in general in the presence of a polymerization initiator. The polymerization initiators customary for the preparation of polyethers can be used as a polymerization initiator for the process according to the invention (Angew. Chemie, 72, 927 to 934 (1960)). The following polymerization initiators may be mentioned as examples: Lewis acids, such as for example boron trifluoride and its adducts (boron trifluoride diethyl etherate and boron trifluoride tetrahydrofuranate), aluminum chloride, iron (III) chloride, tin(IV)chloride, titanium tetrachloride, tin chloride and antimony pentachloride.

Boron trifluoride or boron trifluoride tetrahydrofuranate is the preferred polymerization initiator for the process according to the invention.

The polymerization initiator for the process according to the invention is in general used in an amount of 0.001 to 5.0% by weight, preferably 0.01 to 1.0% by weight, based on the total reaction mixture.

The process according to the invention can be carried out, for example, as follows:

One of the starting materials, preferably tetrahydrofuran and, if appropriate, the alcohol, is initially introduced into the reaction vessel and the polymerization initiator is added. The other reactants are introduced into the reaction mixture. By regulating the rate of the introduction the process can be maintained within the temperature range according to the invention.

After the end of the polymerization the working-up is effected in a customary manner, for example by washing with water and subsequent drying.

The polyethers according to the invention can be used for example as lubricants, but also as thermal oils.

It is possible to use the polyethers according to the invention alone as lubricants, or to mix them with other lubricants which are in themselves known. Examples of other lubricants are: mineral oils with lubricant viscosities, polyethers of the poly-(ethylene oxide) and poly-(propylene oxide)-type, ester lubricating oils of the diester, polyester or neopentyl polyol type, and phosphoric acid esters.

The lubricants according to the invention can also contain customary additives, such as, for example, viscosity index improvers, pour point depressants, dispersants, superbasic dispersants, detergent additives, antioxidants, wear reducers, extreme-pressure additives, anti-corrosion agents, anti-foam agents, etc..

The polyethers according to the invention tolerate the known customary lubricants, so that alternate use without cleaning the system to be lubricated is possible. They also have an unrestricted mixibility with known lubricants.

Surprisingly, the polyethers according to the invention, in the combination of all their properties, exhibit an outstanding suitablity as lubricants which is not achieved by the known lubricants.

The lubricants according to the invention can preferably be employed for reducing the friction in mechanical gears with power transmission by positive connection, in particular worm-gears and hypoid gears, roller bearings and plain bearings, and units for calenders for paper and plastics.

EXAMPLE 1

A mixture of 86.4 g of tetrahydrofuran (containing at most 0.02% of water), 1.9 g of anhydrous methanol and 9.7 g of boron trifluoride tetrahydrofuranate are initially introduced into a three-necked flask of approx. 1 l capacity, and is heated to approx. 35° C. Thereafter, a mixture of 585 g of 1,2-epoxydecane and 36.5 g of anhydrous methanol is added dropwise at a rate such that a reaction temperature of approx. 55° C. is maintained (period of dropwise addition approx. 270 minutes). After a period of further reaction of 1 hour at 55° to 60° C., the mixture is cooled, a solution of 16.2 g of sodium carbonate in 82 g of water is added, the mixture is heated to 100° C. and left at this temperature for 1 hour, the temperature is thereafter increased to 140° C., and water is distilled off. After cooling to approx. 90° C. and further addition of approx. 15 g of water, the mixture is heated to 180° C. under 100 mm Hg for 3 hours and is then left for 2 hours under these conditions, and the oil at approx. 100° C. is forced through a pressure suction filter.

Yield: approx. 743 g (79.4% of theory).

Composition of the oxacycloalkanes employed: tetrahydrofuran: 12.9% by weight, 1,2-epoxyalkanes: 87.1% by weight.

Pour point: −48° to −50° C.

OH number: approx. 77; molecular weight calculated therefrom: approx. 729.

Osmotic molecular weight: 570.

Elementary analysis: 73.80% C, 12.98% H, 13.22% O.

Kinematic viscosities at 37.8° C.: 55.5 mm$^2$/s, 98.9° C.: 8.88 mm$^2$/s.

Viscosity index (extension): 150

EXAMPLE 2

In a manner analogous to that in Example 1, a mixture of 108 g of absolute tetrahydrofuran, 2.4 g of anhydrous methanol and 12.2 g of boron trifluoride tetrahydrofuranate is initially introduced and heated to 30° C., and thereafter a mixture consisting of 487.7 g of 1,2-epoxydodecane, 365.6 g of 1,2-epoxydecane and 45.6 g of anhydrous methanol is added dropwise in the course of 5 hours so that the reaction temperature is at approx. 55° C. After a period of further reaction of one hour at 55° to 60° C., the mixture is worked up in a manner analogous to Example 1.

Yield: 813 g (85.1% of theory).

Composition of the oxacycloalkanes employed: tetrahydrofuran: 11.2% by weight, 1,2-epoxyalkanes: 88.2% by weight.

Pour point: −27° to −28° C.

OH number: 65; molecular weight calculated therefrom: approx. 863.

Elementary analysis: 74.40% C, 12.85% H, 12.75% O.

Kinematic viscosities at 37.8° C.: 66.9 mm$^2$/s, 98.9° C.: 11.0 mm$^2$/s.

Viscosity index (extension): 168

EXAMPLE 3

In a manner analogous to that in Example 1, a mixture of 108 g of absolute tetrahydrofuran, 2.4 g of anhydrous methanol and 12.2 g of boron trifluoride tetrahydrofuranate is initially introduced and heated to from 30° to 35° C., and thereafter a mixture consisting of 975.5 g of 1,2-epoxydodecane and 45.6 g of anhydrous methanol is added dropwise in the course of 6 hours so that the reaction temperature is at approx. 60° C. After a period of further reaction of two hours at 60° C., the mixture is worked up in a manner analogous to Example 1.

Yield: 1.050 g (92.8% of theory).

Composition of the oxacycloalkanes employed: tetrahydrofuran: 10.0% by weight, 1,2-epoxyalkanes: 90.0% by weight.

Pour point: −17° to −18° C.

OH number: 61.5; molecular weight calculated therefrom: 912.

Elementary analysis: 74.93% C, 11.84% H, 13.23% O.

Kinematic viscosities at 37.8° C.: 69.4 mm$^2$/s, 98.9° C.: 10.8 mm$^2$/s.

Viscosity index (extension): 156.

EXAMPLE 4

A mixture of 173.9 g of absolute tetrahydrofuran and 10.5 g of boron trifluoride tetrahydrofuranate is initially introduced into a 2 l three-necked flask and heated to 40° C., and thereafter a mixture of 1,202.5 g of 1,2-epoxydodecane and 186.1 g of absolute tetrahydrofuran is added dropwise in the course of 7.5 hours so that a reaction temperature of 55° C. is established. After a period of further reaction of one hour at 55° C., the mixture is worked up analogously to Example 1.

Yield: 1,264 g (80.9% of theory).

Composition of the oxacycloalkanes employed: tetrahydrofuran: 23.0% by weight, 1,2-epoxyalkanes: 77.0% by weight.

Pour point: −17° to −18° C.

Flash point: 252° to 253° C.

OH number: 23 to 24; molecular weight calculated therefrom: approx. 4775.

Osmotic molecular weight: 2100.

Elementary analysis: 75.16% C, 12.92% H, 11.92% O.

Kinematic viscosities at 37.8° C.: 460.9 mm$^2$/s, 98.9° C.: 56.7 mm$^2$/s.

Viscosity index (extension): 200.

Viscosity/pressure coefficient: 14 [m$^2$/N. 10$^{-9}$].

Coefficient of shearing friction: 0.030.

EXAMPLE 5

Analogously to Example 4, a mixture of 377.5 g of absolute tetrahydrofuran and 13.8 g of boron trifluoride tetrahydrofuranate are initially introduced and heated to 40° C., and thereafter a mixture of 781.2 g 1,2-epoxydodecane and 404.1 g of absolute tetrahydrofuran is added dropwise in the course of 10 hours so that a reaction temperature of from 45° to 50° C. is established. After further reaction for one hour at from 45° to 50° C., the mixture is worked up analogously to Example 1.

Yield: 1,004 g (64.2% of theory).

Composition of the oxacycloalkanes employed: tetrahydrofuran: 50.0% by weight, 1,1-epoxyalkanes: 50.0% by weight.

Pour point: −34° to −35° C.

OH number: 15 to 16; molecular weight calculated therefrom: approx. 7200.

Osmotic molecular weight: 1600.

Elementary analysis: 72.62% C, 12.51% H, 14.86% O.

Kinematic viscosities at 37.8° C.: 913.3 mm$^2$/s, 98.9° C.: 113.7 mm$^2$/s.

Viscosity index (extension): 234.

EXAMPLE 6

Analogously to Example 4, a mixture of 528.3 g of absolute tetrahydrofuran and 16.5 g of boron trifluoride tetrahydrofuranate is initially introduced and heated to 40° C., and thereafter a mixture of 468.7 g 1,2-epoxydodecane and 565.5 g absolute tetrahydrofurane is added dropwise in the course of 6.5 hours so that a reaction temperature of from 45° to 50° C. is established. After further reaction for one hour at from 45° to 50° C., the mixture is worked up analogously to Example 1.

Yield: 982 g (62.8% of theory).

Composition of the oxacycloalkanes employed: tetrahydrofuran: 70.0% by weight, 1,2-epoxyalkanes: 30.0% by weight.

Pour point: −21° to −22° C.

OH number: 11; molecular weight calculated therefrom: approx. 10,200.

Osmotic molecular weight: 1500.

Elementary analysis: 70.48% C, 12.25% H, 17.27% O.

Kinematic viscosities at 37.8° C.: 2272 mm²/s, 98.9° C.: 255.3 mm²/s.

Viscosity index (extension): 264.

EXAMPLE 7

Analogously to Example 1, a mixture of 108 g of absolute tetrahydrofuran, 2.4 g of anhydrous methanol and 12.2 g of boron trifluoride tetrahydrofuranate is initially introduced and warmed to 30° C., and a mixture of 487.7 g of 1,2-epoxydodecane, 551.3 g of a mixture of neoalkanoic acid glycidyl esters (mean molecular weight 245) and 45.6 g of anhydrous methanol is added dropwise to the above mixture in the course of 11 hours so that a reaction temperature of approx. 45° to 50° C. is established. After a period of further reaction of two hours at from 45° to 50° C., the mixture is worked up analogously to Example 1.

Yield: 1,015 g (84.9% of theory).

Composition of the oxacycloalkanes employed: tetrahydrofuran: 9.4% by weight, 1,2-epoxyalkanes: 90.6% by weight, (including the neoalkanoic acid glycidyl esters).

The "1,2-epoxyalkanes" thus contain 47 mol % of neoalkanoic acid glycidyl esters.

Pour point: −37° to −38° C.

OH number: 78; molecular weight calculated therefrom: approx. 720.

Osmotic molecular weight: 600.

Elementary analysis: 70.88% C, 12.07% H, 17.05% O.

Kinematic viscosities at 37.8° C.: 98.1 mm²/s, 98.9° C.: 11.3 mm²/s.

Viscosity index (extension): 111.

EXAMPLE 8

Analogously to Example 4, a mixture of 541.8 g of absolute tetrahydrofuran and 18.0 g of boron trifluoride tetrahydrofuranate is initially introduced and heated to 45° C., and thereafter 773.5 g of a mixture of 1,2-epoxydodecane and 1,2-epoxytetradecane, 232.2 g of absolute tetrahydrofuran and 24.5 g of a dialcohol containing about 36 carbon atoms per molecule are added dropwise in the course of 10 hours so that a reaction temperature of from 45° to 50° C. is established. After a period of further reaction of one hour, the mixture is worked up.

Yield: 1,100 g.

Composition of the oxacycloalkanes employed: tetrahydrofuran: 50.0% by weight, 1,2-epoxyalkanes: 50.0% by weight.

Pour point: −16° C.

OH number: 22 to 23; molecular weight calculated therefrom: approx. 4990

Osmotic molecular weight: 1660.

Elementary analysis: 72.59% C, 12.16% H, 15.34% O.

Kinematic viscosity at −37.8° C.: 895.6 mm²/s, 98.9° C.: 125.9 mm²/s.

Viscosity index (extension): 255.

Viscosity/pressure coefficient: 11 [m²/N.10⁻⁹].

Coefficient of shearing friction: 0.033.

EXAMPLE 9

Analogously to Example 1, a mixture of 900 g of absolute tetrahydrofuran, 1.3 g of anhydrous n-butanol and 13.5 g of boron trifluoride tetrahydrofuranate is initially introduced and heated to 45° C., and a mixture of 24.1 g of n-butanol and 600 g of 1,2-epoxydecane is added dropwise to the above mixture in the course of 11 hours so that a reaction temperature of approx. 45° to 50° C. is established. After a period of further reaction of two hours at from 45° to 50° C., the mixture is worked up.

Yield: 1,163 g

Composition of the oxacycloalkanes employed: tetrahydrofuran: 59.0% by weight, 1,2-epoxyalkanes: 41.0% by weight.

Pour point: −15° C.

OH number: 19 to 20; molecular weight derived therefrom: approx. 2880.

Osmotic molecular weight: 1260.

Elementary analysis: 70.54% C, 12.16% H, 17.30% O.

Kinematic viscosity at 37.8° C.: 878.3 mm²/s, at 98.9° C.: 106.1 mm²/s.

Viscosity index (extension): 227.

Viscosity/pressure coefficient: 14 [m²/N.10⁻⁹].

Coefficient of shearing friction: 0.032.

EXAMPLE 10

119.9 g of anhydrous tetrahydrofuran, 2.17 g of anhydrous methanol and 13.05 g of a boron trifluoride/tetrahydrofuran adduct are initially introduced into an air-tight shaken vessel which has a capacity of approx. 2 l, is composed of thick glass and has the possibility of internal cooling; the mixture is warmed to about 40° C. A mixture consisting of 250.3 g of ethylene oxide, 286.0 g of propylene oxide, 329.4 g of 1,2-epoxydecane and 41.25 g of anhydrous methanol is then pumped in, while shaking thoroughly and cooling if appropriate, at such a rate that the reaction temperature does not exceed 55° C. After the end of the addition, the mixture is allowed to react further for 1 hour.

After the vessel has been flushed for a short time with nitrogen gas to remove readily volatile starting materials, a solution of 30.6 g of anhydrous sodium carbonate in 153.6 g of water is added, and the mixture is heated to 100° C. while a gentle stream of nitrogen is passed through, thereafter slowly heated to 140° C., and kept at this temperature for 2 hours. By these measures, residual tetrahydrofuran and low molecular weight volatile cyclic oligomers are removed.

After a repeated addition of water, the reaction mixture is cooled and the polyether is separated off.

The starting components are contained in the polyether in the following proportions:

10.6 parts by weight of tetrahydrofuran, 25.8 parts by weight of ethylene oxide, 29.6 parts by weight of propylene oxide and 34.0 parts by weight of epoxydecane.

Molecular weight: 830 (based on the OH number).

Molecular weight: 620 (determined by osmosis).

Pour point: −58° to −59° C.

Kinematical viscosity at 40° C.: 54.8 mm², at 100° C.: 10.88 mm².

Viscosity index: 193.

To test the tolerance for mineral oil, 10 parts by weight of the polyether were mixed intensively at 100° C. with 90 parts by weight of a paraffin-based mineral oil (ASTM classification: ASTM-D2226; 104; B, density at 15° C. 0.888 [g/cm$^3$]; viscosity at 50° C. 87.4 [mm$^2$] and at 100° C. 14.3 [mm$^2$]; composition: 3% of aromatic hydrocarbons, 32% of naphthenic hydrocarbons and 65% of paraffinic hydrocarbons). After the mixture had been standing for two weeks, it was tested for the formation of a clear solution. The sample according to Example 10 gives a clear solution; it thus has a tolerance for mineral oil. The frictional behavior of the polyether was determined on a twin-disc friction testing apparatus [6.8], as a function of the contact force $F_N$, the disc circumferential velocity $V_1$, and the slip $s=(V_1-V_2)/V_1$.

The lubricant is squirted between the test discs at a squirting temperature of 50° C.

The discs consist of a material described as 100 Cr6 according to DIN (German Industrial Standards) 17,006. Both discs have diameters of 80 mm, and one disc is in the form of a cylinder and the other has the form of a sphere section. The arithmetic mean roughness coefficient of the discs $R_a$ is approx. 0.085 μm.

The dependence of the friction coefficient on slip, on the contact force and on the circumferential velocity is represented in FIGS. 1 to 4.

Figure 2:
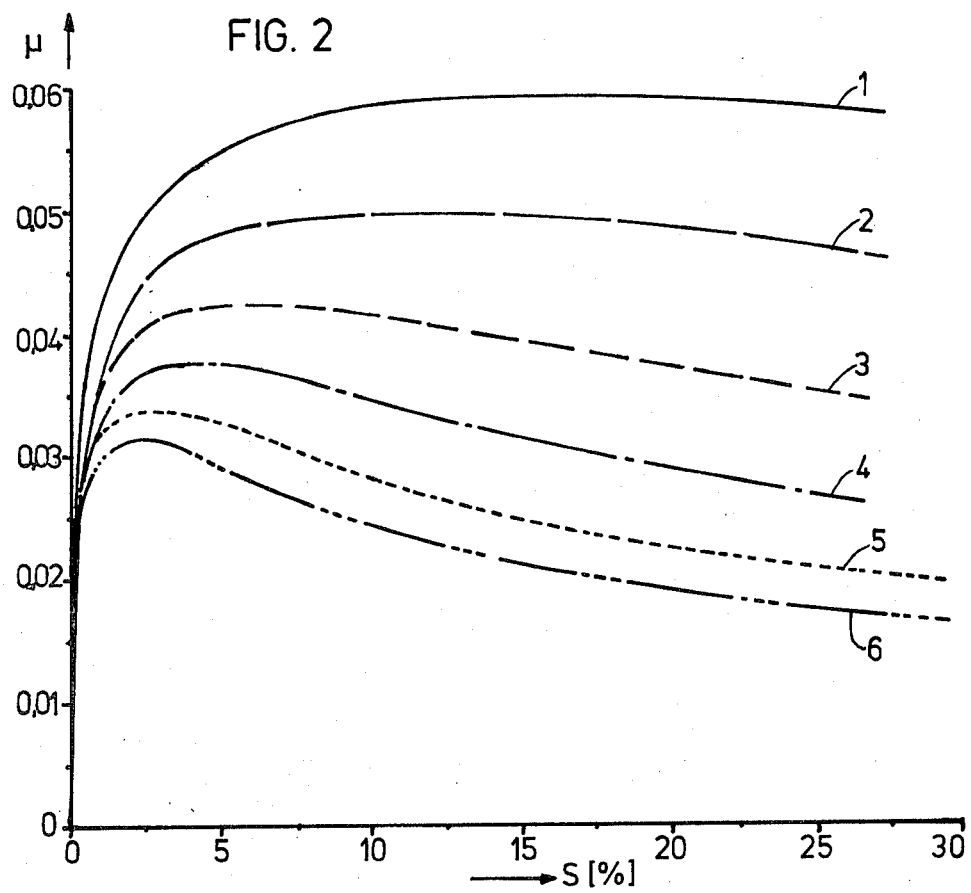
Figure 3:
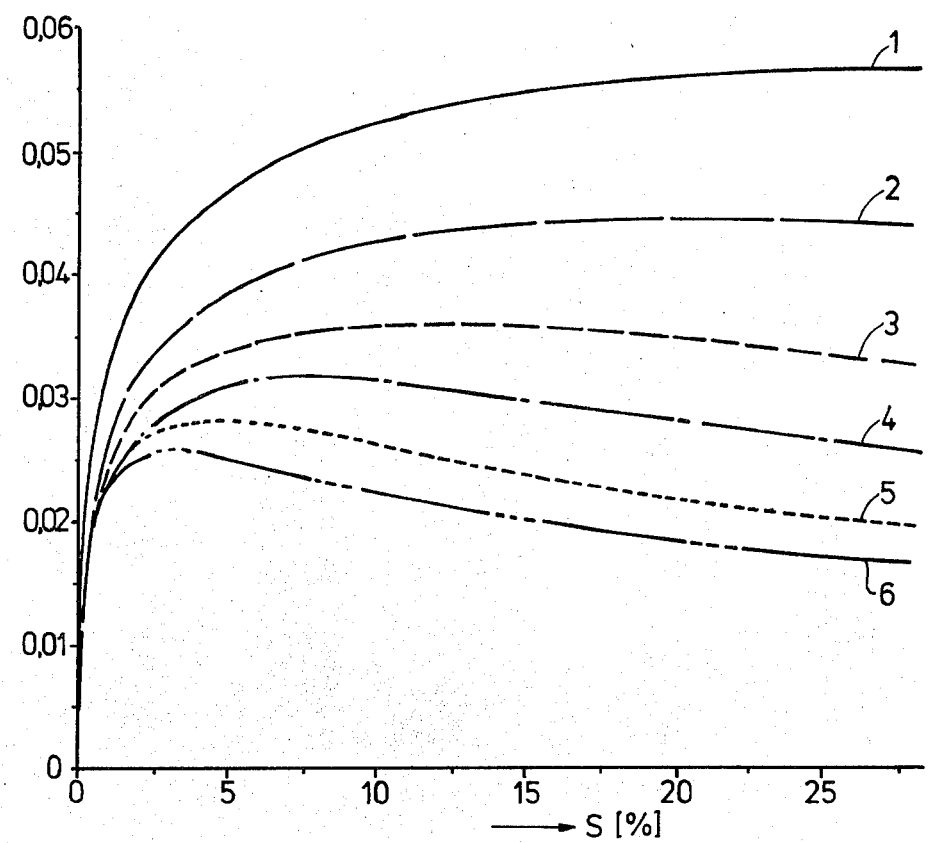
Figure 4:
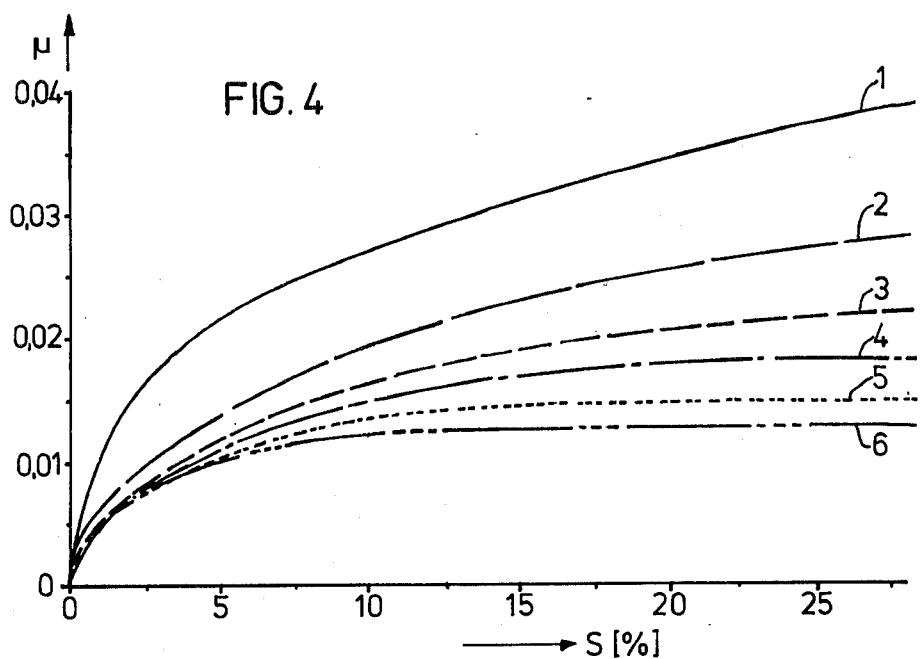
Figure 5:
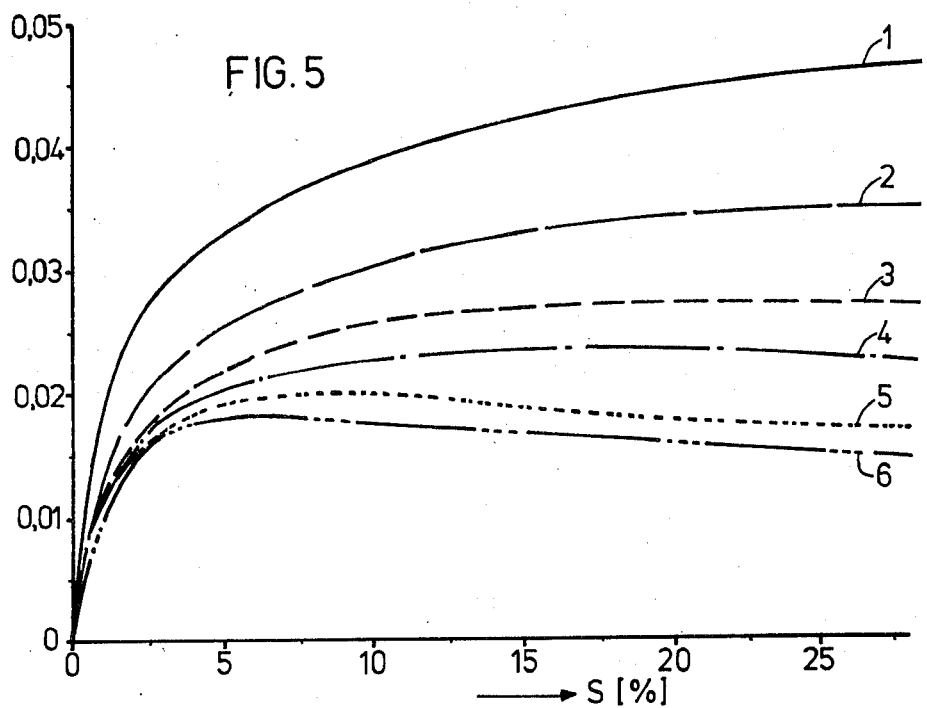

The measured results represented in the figures which follow were determined under the following conditions of operation (corresponding Hertz compression is given in brackets):

FIG. 1—$F_N=125N$ (750N/mm$^2$)
FIG. 2—$F_N=400N$ (1,100N/mm$^2$)
FIG. 3—$F_N=1,000N$ (1,500N/mm$^2$)
FIG. 4—$F_N=2,000N$ (1,890N/mm$^2$)
FIG. 5—$F_N=4,080N$ (24,000N/mm$^2$)

In the individual FIGS. 1 to 5, the symbols correspond to the following disc peripheral velocities:

1—V=0.42 m/s
2—V=0.84
3—V=2.10
4—V=4.19
5—V=8.38
6—V=12.57

The results show the friction coefficients, which are particularly low in the entire range investigated.

In the test according to Almen-Wieland (Schweizer Archiv, Annales Suisses, M. Brunner and R. Pedrini, Part 1, June 1955, No. 6, pages 169 to 177; Part 2, August 1955, No. 8, pages 251 to 257), the polyether according to Example 1 shows a welding load which is greater than 18,000N; at a frictional force greater than 3,500N and a temperature of 116° C., the machine is blocked but not welded.

The Reichert frictional wear test at a load of 15N gives a wear index of 11.3 mm$^2$ and a specific load capacity of 26.7 mPa for the polyether according to Example 1 (Schmierungstechnik (1960) No. 5, E. Kadmer and H. Danninger).

The viscosity/pressure coefficient required to describe the lubricating film-forming properties has been determined via the effective lubricating film thickness in rolling contact in a test device (Schmierungstechnik und Tribologie, 27, (1980) 2, pages 55 to 57). The following values in μs have been obtained:

Viscosity/pressure coefficient: 13 [m$^2$/N.10$^{-9}$].
Coefficient of shearing friction: 0.030.

EXAMPLE 11

This example is carried out analogously to Example 10, by initially introducing a mixture consisting of 108 g of absolute tetrahydrofuran, 2.4 g of absolute methanol and 14.5 g of boron trifluoride tetrahydrofuranate, and adding a mixture consisting of 66 g of ethylene oxide, 577.2 g of an industrial 1,2-epoxydodecane and 45.6 g of absolute methanol.

Composition:
14.4 parts by weight of tetrahydrofuran,
8.8 parts by weight of ethylene oxide and
76.8 parts by weight of 1,2-epoxydodecane.
Molecular weight: about 640 (based on the OH number).
Molecular weight: 530 (determined by osmosis).
Pour point: −22° C.
Kinematic viscosity at 37.8° C.: 47.1 mm$^2$/sec, at 98.9° C.: 8.10 mm$^2$/sec.
Viscosity index: 157.

The ratio of the number of carbon atoms to the number of oxygen atoms is 7.80:1.

The product also has a good compatibility with mineral oil.

EXAMPLE 12

This example is prepared analogously to Example 1, by initially introducing a mixture consisting of 135 g of absolute tetrahydrofuran, 2.8 g of absolute methanol and 16.4 g of boron trifluoride tetrahydrofuranate, and adding a mixture consisting of 312.9 g of ethylene oxide, 376.1 g of propylene oxide, 425.7 g of an industrial 1,2-epoxydodecane and 51.5 g of absolute methanol, under the same reaction conditions and working-up conditions.

The starting components are contained in the polyether in the following proportions:
25.0 parts by weight of ethylene oxide,
30.1 parts by weight of propylene oxide,
34.1 parts by weight of 1,2-epoxydodecane and
10.8 parts by weight of tetrahydrofuran.
Molecular weight: about 900 (based on the OH number).
Molecular weight: 650 (determined by osmosis).
Pour point: −45° to −46° C.
Kinematic viscosity at 37.8° C.: 63.8 mm$^2$/sec, at 98.9° C.: 11.6 mm$^2$/sec.
Viscosity index: 191.

The ratio of the number of carbon atoms to the number of oxygen atoms is 3.81:1.

The product also has a good compatibility with mineral oil.

Viscosity/pressure coefficient: 3[m$^2$/N.10$^{-9}$].

EXAMPLE 13

A mixture of 324 g of absolute tetrahydrofuran, 5.55 g of absolute butanol and 8.1 g of boron trifluoride tetrahydrofuranate is initially introduced into the reaction vessel, and a mixture of 468 g of 1,2-epoxydecane, 324 g of 1,2-butylene oxide and 105.5 g of absolute butanol is metered in, with external cooling, at such a rate that a reaction temperature of from 27° to 33° C. is maintained. After further reaction for about two hours at 30° C., the reaction mixture is worked up analogously to Example 1.

The starting components are contained in the polyether in the following proportions:
29.0 parts by weight of 1,2-butylene oxide,
42.0 parts by weight of 1,2-epoxydecane and
29.0 parts by weight of tetrahydrofuran.
Molecular weight: 1,060 (calculated from the OH number).

Molecular weight: 700 (determined by osmosis).
Pour point: −50° C.
Kinematic viscosity at 37.8° C.: 103.3 mm²/sec, at 98.9° C.: 26.0 mm²/sec.
Viscosity index: 177.
The ratio of the number of carbon atoms to the number of oxygen atoms is 5.34:1.
The product also has a good compatibility with mineral oil.

EXAMPLE 14

259.6 g of anhydrous tetrahydrofuran and 15.6 g of a boron trifluoride/tetrahydrofuran adduct are initially introduced into an air-tight closed shaken vessel which has a capacity of approx. 2 l, is composed of thick glass, and has the possibility of internal cooling, and the mixture is warmed to 40° C. A monomer mixture consisting of 278.0 g of tetrahydrofuran, 129.9 g of propylene oxide, 217.1 g of ethylene oxide and 495.5 g of 1,2-epoxydodecane is then pumped in, while shaking and if necessary cooling, so that temperature does not exceed 55° C. After the end of the addition, the mixture is allowed to react further for one hour.

After the vessel has been flushed for a short time with nitrogen gas to remove readily volatile starting materials, a solution of 30.6 g of anhydrous sodium carbonate in 153.6 g of water is added, and the mixture is heated to 100° C. while a gentle stream of nitrogen is passed through, thereafter slowly heated to 140° C., and kept at this temperature for 2 hours. By this measure, residual tetrahydrofuran and lower molecular weight volatile cyclic oligomers are removed.

The starting components are contained in the polyether in the following proportions:
15.7 parts by weight of ethylene oxide
9.4 parts by weight of propylene oxide
36.0 parts by weight of 1,2-epoxydodecane
39.0 parts by weight of tetrahydrofuran
Molecular weight: 4,315 (calculated from the OH-number).
Molecular weight: 1,200 (by osmosis).
Pour point: −39° to −40° C.; flash point: 247° C.
Kinematic viscosity at 40° C.: 50.2 mm²/s, at 100° C.: 75.8 mm²/s.
Viscosity index: 229
Ratio of the number of carbon atoms to the number of oxygen atoms: 4.58:1.

To test the compatibility with mineral oils, 10 parts by weight of the polyether were mixed intensively, at 100° C., with 90 parts by weight of a paraffin-based mineral oil (ASTM classification ASTM-D 2226; 104; B, density at 15° C. 0.888 [g/m³]; viscosity at 50° C. 87.4 [mm²/sec] and at 100° C. 14.3 [mm²/sec]; composition: 3% of aromatic hydrocarbons, 32% of naphthenic hydrocarbons and 65% of paraffinic hydrocarbons). After standing for two weeks, the mixture was tested for the formation of a clear solution. The sample according to Example 14 gives a clear solution; it is thus compatible with mineral oils.

EXAMPLE 15

This example is carried out analogously to Example 14, by initially introducing a mixture consisting of 145.8 g of absolute tetrahydrofuran, 1.7 g of butane-1,4diol and 9.4 g of boron trifluoride tetrahydrofuranate, and adding a mixture consisting of 178.2 g of absolute tetrahydrofuran, 149.2 g of ethylene oxide, 196.8 g propylene oxide, 924.7 g, 1,2-epoxydodecane and 32.1 g of butane-1,4-diol, under the same reaction conditions and working-up conditions. Thus, 34.6 moles of oxacycloalkane are added per mole of butane-1,4-diol.
Yield: 939 g.
The starting components are contained in the polyether in the following proportions:
15.0 parts by weight of ethylene oxide
19.8 parts by weight of propylene oxide
32.6 parts by weight of 1,2-epoxydodedane
32.6 parts by weight of tetrahydrofuran
Molecular weight: approx. 2,100 (calculated from the OH—number).
Molecular weight: 1,200 (by osmosis).
Pour point: −39° C.; flash point: 197° to 198° C.
Kinematic viscosity at 37.8° C.: 313.3 mm²/s, at 98.9° C.: 42.8 mm²/s.
Viscosity index: 202.
The ratio of the number of carbon atoms to the number of oxygen atoms is 4.19:1.
According to the test method described in Example 10, the product also has a good compatibility with mineral oils.

EXAMPLE 16 (COMPARATIVE EXAMPLE)

This comparative example is carried out analogously to Example 14, by initially introducing a mixture consisting of 162 g of absolute tetrahydrofuran, 5.6 g of butane-1,4-diol and 10.5 g of boron trifluoride tetrahydrofuranate, and adding a mixture consisting of 198 g of absolute tetrahydrofuran, 240 g of ethylene oxide, 359.9 g of propylene oxide, 239.5 g 1,2-epoxydodecane and 106.9 g of butane-1,4-diol, under the same reaction conditions and working-up conditions. Thus, 14.3 moles of cyclic ethers ("oxacycloalkanes") are added per mole of butane-1,4-diol (mean molecular weight of the oxacycloalkanes 67.1).
The starting components are contained in the polyether in the following proportions:
20.0 parts by weight of ethylene oxide
30.0 parts by weight of propylene oxide
20.0 parts by weight of 1,2-epoxydodecane
30.0 parts by weight of tetrahydrofuran
Molecular weight: approx. 1,060 (calculated from the OH—number).
Molecular weight: 710 (by osmosis).
Pour point: −40° to −41° C.; flash point: 195° to 196° C.
Kinematic viscosity at 37.8° C.: 146.1 mm²/s, at 98.9° C.: 20.0 mm²/s.
Viscosity index: 168.
The ratio of the number of carbon atoms to the number of oxygen atoms is 3.39:1.
The product is not compatible with mineral oils.
What is claimed is:

1. A polyether obtained by polymerization of an α-alkylene oxide, said α-alkylene oxide having an alkylene radical which contains 8 to 26 carbon atoms, and a tetrahydrofuran in the presence of a hydroxy compound of the formula $$H-OR^1$$

wherein $R^1$ denotes hydrogen, an alkyl radical having 1 to 4 carbon atoms or a hydroxy-alkyl radical having 2 to 40 carbon atoms, said polymerization conducted in the presence of a polymerization initiator comprising a Lewis acid selected from the group consisting of boron trifluoride, boron trifluoride diethyl etherate, boron trifluoride tetrahydrofuranate, aluminum chloride, iron (III) chloride, tin (IV) chloride, titanium tetrachloride, tin chloride and antimony pentachloride, said polyether having a molecular weight of 40 to 10,000 and a kinematic viscosity at 40° C. of 5 to 3,000 mPa.s.

2. A polyether according to claim 1, prepared by polymerization of 10 to 98 parts by weight of said α-alkylene oxide and 2 to 98 parts by weight of said tetrahydrofuran.

3. A polyether according to claim 1, prepared by a polymerization of 10 to 90 parts by weight of said α-alkylene oxide, 5 to 55 parts by weight of tetrahydrofuran and further including 0 to 70 parts by weight of ethylene oxide and/or 0 to 70 parts by weight of propylene oxide or butylene oxide, at least one of ethylene oxide or propylene oxide or butylene oxide being employed, and wherein at least some of said hydroxy compound is a monofunctional hydroxy compound of the formula H—OR[1] 

wherein R[1] denotes an alkyl radical with 1 to 24 carbon atoms, and the ratio of the number of carbon atoms to the number of oxygen atoms in the polyether is 3.2 to 10:1.

4. A polyether according to claim 1 obtained by polymerization of 10 to 90 parts by weight of said α-alkylene oxide, 5 to 55 parts by weight of tetrahydrofuran and further including 0 to 70 parts by weight of ethylene oxide and/or 0 to 70 parts by weight of propylene oxide or butylene oxide, at least one of ethylene oxide or propylene oxide or butylene oxide being employed, and wherein at least some of said hydroxy compound is a hydroxy compound of the formula H—OR[1] 

wherein R[1] denotes hydrogen or hydroxy alkyl radical with 2 to 40 carbon atoms, and the ratio of the number of carbon atoms to the number of oxygen atoms in the polyether is 3.6 to 10:1.

5. A polyether according to claim 1, wherein said tetrahydrofuran is unsubstituted tetrahydrofuran or tetrahydrofuran which is substituted by $C_1$ to $C_4$ lower alkyl radicals.

6. A polyether according to claim 1, which has a molecular weight of 600 to 4,000.

7. A polyether according to claim 1, having a kinematical viscosity of 20 to 500 mPa.s.

8. A polyether according to claim 1, having a viscosity index of 150 to 220.

9. A polyether according to claim 8, having a kinematical viscosity at 40° C. of 5 to 3,000 mPa.s.

10. A polyether according to claim 1, wherein said α-alkylene oxide is 1,2-epoxydodecane.

11. A polyether according to claim 1, wherein said α-alkylene oxide is 1,2-epoxytetradecane.

12. A polyether according to claim 1, wherein said radical of α-alkylene oxide contains 12 to 26 carbon atoms.

13. A polyether according to claim 3, wherein said ratio is 3.4 to 9.5:1.

14. A polyether according to claim 3, wherein said ratio is 3.6 to 9.0:1.

15. A polyether according to claim 4, wherein said ratio is 3.8 to 9.5:1.

16. A polyether according to claim 4, wherein said ratio is 4.0 to 9.0:1.

17. A lubricant composition comprising a major amount of a polyether according to claim 1 and a diluent.

18. A lubricant composition according to claim 17, wherein said diluent is a mineral oil.

19. A process for the preparation of a polyether which comprises polymerizing an α-alkylene oxide, said α-alkylene oxide having an alkylene radical which contains 8 to 26 carbon atoms, and a tetrahydrofuran in the presence of a hydroxy compound of the formula H—OR[1] 

wherein R[1] denotes hydrogen, an alkyl radical with 1 to 24 carbon atoms or a hydroxyl radical with 40 carbon atoms, said polymerization conducted in the presence of a polymerization initiator comprising a Lewis acid selected from the group consisting of boron trifluoride, boron trifluoride diethyl etherate, boron trifluoride tetrahydrofuranate, aluminum chloride, iron (III) chloride, tin (IV) chloride, titanium tetrachloride and antimony pentachloride.

20. A process according to claim 19, wherein the hydroxy compound is employed in an amount of 0.3 to 90% by weight, based upon the weight of the total reaction mixture.

21. A process according to claim 19, wherein the polymerization is carried out in a temperature range of from −20° to +100° C.

22. In a method of lubricating a transmission including a plurality of power transmission gears wherein a lubricant is interposed between the relatively moving parts of said transmission, the improvement comprising interposing a lubricant comprising a polyether prepared by polymerization of an α-alkylene oxide, said α-alkylene oxide having an alkylene radical which contains 8 to 26 carbon atoms, and a tetrahydrofuran in the presence of a hydroxy compound of the formula H—OR[1] 

wherein R[1] denotes hydrogen, an alkyl radical having 1 to 24 carbon atoms or a hydroxyalkyl radical having 2 to 40 carbon atoms, said polymerization conducted in the presence of a polymerization initiator comprising a Lewis acid selected from the group consisting of boron trifluoride, boron trifluoride tetrahydrofuranate, boron trifluoride diethyl etherate, aluminum chloride, iron (III) chloride, tin (IV) chloride, titanium tetrachloride and antimony pentachloride, said polyether having a molecular weight of 400 to 10,000 and a kinematic viscosity at 40° C. of 5 to 3,000 mPa.s.

23. In a method of lubricating opposed rolling or engaging surfaces wherein a lubricant is interposed between the opposed rolling or engaging surfaces, the improvement comprising interposing a lubricant comprising a polyether prepared by polymerization of an α-alkylene oxide, said α-alkylene oxide having an alkylene radical which contains 8 to 26 carbon atoms, and a tetrahydrofuran in the presence of a hydroxy compound of the formula H—OR[1] 

wherein R[1] denotes hydrogen, an alkyl radical having 1 to 24 carbon atoms or a hydroxyalkyl radical having 2 to 40 carbon atoms, said polymerization conducted in the presence of a polymerization initiator comprising a Lewis acid selected from the group consisting of boron trifluoride, boron trifluoride diethyl etherate, boron trifluoride tetrahydrofuranate, aluminum chloride, iron (III) chloride, tin (IV) chloride, titanium tetrachloride and antimony pentachloride, said polyether having a molecular weight of 400 to 10,000 and a kinematic viscosity at 40° C. of 5 to 3,000 mPa.s.

24. A lubricant comprising a major amount of an oil of lubricating viscosity and a minor amount of a polyether according to claim 1.

* * * * *